UNITED STATES PATENT OFFICE.

CHARLES H. CAMPBELL, OF CHICAGO, ILLINOIS, ASSIGNOR TO AMERICAN GLUE COMPANY, OF BOSTON, MASSACHUSETTS, A CORPORATION OF MASSACHUSETTS.

PROCESS OF MAKING A RETARDER FOR PLASTER AND THE LIKE FROM LIME WASTAGE.

1,106,778.      Specification of Letters Patent.      Patented Aug. 11, 1914.

No Drawing.      Application filed October 18, 1910. Serial No. 587,647.

*To all whom it may concern:*

Be it known that I, CHARLES H. CAMPBELL, of Chicago, in the county of Cook and State of Illinois, a citizen of the United States, have invented a new and useful Process of Making a Retarder for Plaster and the like from Lime Wastage, of which the following is a full, clear, and exact description.

In my copending application for Letters Patent of the United States, filed May 12, 1910, Serial No. 561,014, I have described and claimed a retarder for plaster and the like, especially calcined gypsum hard wall plaster, and which is product obtained from the treatment of lime wastage from the liming of hides. As recited in said application, the lime wastage in itself as it comes from the lime vats cannot be used for purposes of a retarder essentially for the reason that it possesses an offensive odor and contains certain insoluble animal matter such as shreds of hide, grease and a small quantity of hair.

The present process essentially relates to a method of treatment by which the lime wastage is made available for purposes of a retarder and consists in the conversion of the insoluble animal matter therein by making the same soluble, together also with added steps, as will later be more fully explained. The conversion of the insoluble animal matter, or, in other words, making the same soluble, is obtained by rendering the lime present in the wastage a more active agent or solvent, and this is accomplished essentially by heating the wastage with water added to it in a digester until the conversion of the insoluble animal matter.

I prefer to combine the lime wastage and water in about the proportions by weight of 50% of lime wastage to 50% water and to subject the component mass to a moderate temperature of about 212° F. (a temperature of 250° F. being advantageously maintained until the animal impurities are converted). During the heating, in order to obtain the best results, the liquor should be kept agitated to keep the solids in suspension.

It is to be observed that the process of preparing the retarder may be carried on as above described without the addition of other alkali than that residing in the lime itself. The process is, however, better and more advantageously carried on by heating the wastage in the presence of an added alkali. The lime wastage is first placed in a digester (preferably a steam-jacketed digester), there being added also water, a suitable alkali and preferably a small amount of hair other than that contained in the waste lime. In practice I have combined in the digester a composition consisting of about 22% waste lime, 4% caustic (of which 1% is caustic soda and 3% fresh hydrated lime), 9% hair or other equivalent matter and the remaining 65% water. In other words, for a ton of the composition on the 35% solids basis there are about 440 lbs. of waste lime, 20 lbs. of caustic soda, 60 lbs. of fresh hydrated lime, 180 lbs. of hair, and the rest water. If no auxiliary hair or other equivalent matter is added then in practice I combine in the digester a composition consisting of about 32½% waste lime, 2½% caustic (of which ½ of 1% is caustic soda, 2% fresh hydrated lime) and the rest water. In other words, for a ton of the composition on the 35% solids basis there are about 650 lbs. waste lime, 10 lbs. caustic soda, 40 lbs. fresh hydrated lime and 1,300 lbs. water. These components are cooked at a moderate temperature of about 212° F., a temperature of 250° F. being advantageously maintained, until the solids are all or about all converted. This may be determined by observing whether the shreds of hide and hair have disappeared from the top surface of the cook (the same tending to rise thereon) and the mass as it is stirred taken on a smooth and finished appearance. When this takes place further digestive treatment should be stopped. In order to obtain the best results agitation should be kept up during the cooking to bring the hair and albuminous matter into contact with the caustic and to keep the lime in suspension.

When the solids have become all or about all converted water is preferably directed into the liquor so as to compensate for that lost during evaporation during the cooking in order to keep the solids and water in about the proportions above given and also for the purpose of slightly cooling the mass. The liquor is then directed by pumping or otherwise into what may be termed a storage and cooling vat. There is still considerable latent heat in the liquor and this heat may act to complete the conversion of any remaining hair and albuminous matter, if any is left in the liquor. In fact I prefer to so carry on the "cook" that the hair and albuminous matter will not quite all be converted in the digester as may be determined by the appearance of the cook but will become converted by the latent heat remaining in the liquor after the liquor has been removed from the digester into the storage and cooling vat. During the time that the liquor is kept in the cooling vat, in order to obtain the best results, agitation should be kept up for keeping the solids in suspension and the liquor in the vat uniform.

The liquor is preferably kept in the cooling vat until the latent cooking heat has passed out of the liquor. In practice the liquor is kept in the vat for a period of from two to three hours. From the cooling vat the liquor is next directed to the drier. This drier consists of a receptacle in the nature of a large receiving pan within which steam-heated rolls are arranged to turn and dip into the chamber of the pan. In other words, the rolls are so arranged that a portion of the peripheral surfaces thereof will dip into the liquor in the pan and act to take up the liquor as the rolls are turned.

By reason of the proportioning of the solids and liquid as above referred to and by reason also of the added water, the consistency of the liquor in the receiving pan is about 35 to 38% solids and the rest water, some water having been lost by evaporation. Accordingly the rolls will act to dip up rather a thin film of liquor which is about $\frac{1}{32}$ of an inch thick. The film of liquor so taken up is dried by subjecting it to a high drying temperature for a relatively short period of time, or, in other words, until the material has become dried, which fact may be determined by the changed color of the product, it becoming when dried of a grayish color. In practice I maintain a temperature within the drying rolls of about 290° F. and the drying of the liquor takes about eight seconds from the time when the liquor is taken up on the rolls until the time it has become dried and is taken or scraped off the rolls. To insure a uniform finished product the liquor contained in the receiving pan during the drying should be kept continuously agitated in order to keep the solids in suspension. The resultant material is then preferably ground to from 120 to 140 mesh.

Having thus fully described my invention, I claim and desire to secure by Letters Patent of the United States:—

1. A process of making a retarder from lime wastage obtained from the liming of hides, which comprises converting the insoluble animal matter in said wastage into soluble matter.

2. A process of making a retarder from lime wastage obtained from the liming of hides, which comprises converting the insoluble animal matter in said wastage into soluble matter by making the lime present in the wastage a more active agent.

3. A process of making a retarder from lime wastage obtained from the liming of hides, which comprises converting the insoluble animal matter in said wastage into soluble matter by making the lime present in the wastage a more active agent through the application of heat and moisture thereto.

4. A process of making a retarder from lime wastage obtained from the liming of hides, which comprises cooking the lime wastage in a suitable alkaline solution until the insoluble animal matter therein has been converted into soluble matter.

5. A process of making a retarder from lime wastage obtained from the liming of hides, which comprises converting the insoluble animal matter in said wastage into soluble matter and drying the resultant product.

6. A process of making a retarder from lime wastage obtained from the liming of hides, which comprises converting the insoluble animal matter in said wastage into soluble matter, drying and grinding the resultant product.

7. A process of making a retarder from lime wastage obtained from the liming of hides, which comprises converting the insoluble animal matter in said wastage into soluble matter, agitating the mass during the period of conversion, and subsequently drying the resultant product.

8. A process of making a retarder from lime wastage obtained from the liming of hides, which comprises converting the insoluble animal matter in said wastage into soluble matter by cooking the mass in the presence of a suitable alkaline solution, the mass being kept agitated during the period of conversion, and afterward drying the resultant product in thin films by applied heat.

9. A process of making a retarder from lime wastage obtained from the liming of hides, which comprises converting the insoluble animal matter in said wastage into soluble matter by cooking the mass in the presence of a suitable alkaline solution, the mass being kept agitated during the period of conversion, cooling the mass kept agitated, then drying the mass kept agitated in thin films by applied heat, and subsequently grinding the resultant product.

CHARLES H. CAMPBELL.

Witnesses:
JOHN E. R. HAYES,
GEORGE LANGTON.